(12) United States Patent
Gaynor et al.

(10) Patent No.: US 7,820,947 B2
(45) Date of Patent: Oct. 26, 2010

(54) SLOW COOKER

(75) Inventors: Jim Gaynor, Richmond, VA (US);
Yvonne Olson, Richmond, VA (US);
Adam Steinman, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 316 days.

(21) Appl. No.: 11/933,478

(22) Filed: Nov. 1, 2007

(65) Prior Publication Data

US 2008/0053984 A1    Mar. 6, 2008

Related U.S. Application Data

(63) Continuation of application No. 11/363,882, filed on Feb. 28, 2006, now Pat. No. 7,605,349.

(51) Int. Cl.
*F27D 11/00* (2006.01)
*A47J 27/62* (2006.01)

(52) U.S. Cl. .................. 219/442; 219/386; 219/390; 219/391; 219/441; 219/506; 219/492; 219/494; 219/400; 219/497; 99/331; 99/332; 99/333; 99/403; 165/47; 361/678; 361/690; 361/692

(58) Field of Classification Search ............... 219/386, 219/390–1, 441–3, 435, 492, 494, 449, 497, 219/506, 400, 518; 99/331–3, 403; 165/47; 361/678, 690, 692

See application file for complete search history.

(56) References Cited

U.S. PATENT DOCUMENTS 1,979,222 A    10/1934  Goodwin 3,285,159 A  * 11/1966  Greene ........................ 99/343
3,323,724 A     6/1967  Willson (Continued)

FOREIGN PATENT DOCUMENTS

EP         0168985 A1    1/1986

(Continued)

OTHER PUBLICATIONS

Office Action issued Aug. 22, 2007 in U.S. Appl. No. 11/363,882.

(Continued)

*Primary Examiner*—Shawntina Fuqua
(74) *Attorney, Agent, or Firm*—Panitch Schwarze Belisario & Nadel LLP

(57) ABSTRACT

A cooking appliance for cooking a foodstuff over a period of time including a shell having a heating cavity and a heating element to heat the heating cavity. A container is removably positionable within the heating cavity and includes a food cavity for receiving the foodstuff. A temperature probe is removably insertable into the foodstuff and a controller is mounted to the shell. The controller controls operation of the cooking appliance in a probe mode wherein the temperature probe is inserted into the foodstuff and transmits foodstuff temperatures to the controller for controlling the heating of the foodstuff, a program mode wherein the controller actuates the heating element to heat the container at a temperature for a selected amount of time and subsequently at a lower temperature and a manual mode wherein the controller actuates the heating element to heat the container at a selected temperature.

17 Claims, 5 Drawing Sheets

U.S. PATENT DOCUMENTS

| | | | |
|---|---|---|---|
| 3,330,940 | A | 7/1967 | Hocker |
| 3,619,560 | A | 11/1971 | Buiting et al. |
| 3,650,201 | A | 3/1972 | Jovanovic |
| 3,739,148 | A | 6/1973 | Ryckman, Jr. |
| 3,904,852 | A | 9/1975 | Rivelli et al. |
| 3,908,111 | A * | 9/1975 | Du Bois et al. ............. 219/442 |
| 4,038,510 | A * | 7/1977 | White ........................ 219/712 |
| 4,048,473 | A | 9/1977 | Burkhart |
| 4,063,068 | A | 12/1977 | Johnson et al. |
| 4,103,604 | A | 8/1978 | Berard |
| 4,307,287 | A | 12/1981 | Weiss |
| 4,313,051 | A | 1/1982 | Aoshima |
| 4,393,300 | A | 7/1983 | Proctor |
| 4,463,249 | A | 7/1984 | Narita et al. |
| 4,503,320 | A * | 3/1985 | Polster ....................... 219/441 |
| 4,535,386 | A | 8/1985 | Frey, Jr. et al. |
| D281,050 | S | 10/1985 | Cesaroni et al. |
| 4,551,590 | A | 11/1985 | Mahon |
| 4,566,802 | A | 1/1986 | Kochler |
| 4,668,878 | A | 5/1987 | Wyss |
| 4,674,890 | A | 6/1987 | Kojima et al. |
| 4,695,683 | A | 9/1987 | Wingler et al. |
| 4,695,710 | A | 9/1987 | Yamashita et al. |
| 4,697,429 | A | 10/1987 | Chandler et al. |
| 4,764,715 | A | 8/1988 | Kowalewski et al. |
| 4,818,547 | A | 4/1989 | Miwa et al. |
| 5,160,831 | A | 11/1992 | Thaler et al. |
| 5,183,998 | A | 2/1993 | Hoffman et al. |
| 5,323,692 | A | 6/1994 | Grzywna et al. |
| 5,352,874 | A | 10/1994 | Gong |
| 5,365,038 | A | 11/1994 | Mitsugu |
| 5,477,029 | A | 12/1995 | Skutt et al. |
| 5,539,185 | A | 7/1996 | Polster |
| 5,539,856 | A | 7/1996 | Andrew et al. |
| 5,567,458 | A | 10/1996 | Wu |
| 5,589,092 | A | 12/1996 | Chang |
| 5,662,025 | A | 9/1997 | Yoo |
| D391,926 | S | 3/1998 | Brunner et al. |
| 5,734,149 | A | 3/1998 | Skutt et al. |
| 5,771,783 | A | 6/1998 | Uss |
| 5,827,556 | A | 10/1998 | Maher, Jr. |
| 5,892,206 | A | 4/1999 | Higgins |
| D420,246 | S | 2/2000 | Alonge et al. |
| 6,186,053 | B1 | 2/2001 | Nakano et al. |
| 6,191,393 | B1 | 2/2001 | Park |
| 6,196,113 | B1 | 3/2001 | Yung |
| 6,274,847 | B1 | 8/2001 | Hlava et al. |
| 6,318,247 | B1 | 11/2001 | Di Nunzio |
| D453,091 | S | 1/2002 | Gouthiere |
| 6,362,459 | B1 | 3/2002 | Schmidt |
| D455,040 | S | 4/2002 | Pannozzo et al. |
| RE37,988 | E | 2/2003 | Uss |
| 6,546,846 | B1 | 4/2003 | Lin |
| 6,573,483 | B1 | 6/2003 | DeCobert et al. |
| 6,587,739 | B1 | 7/2003 | Abrams et al. |
| 6,615,706 | B1 * | 9/2003 | Wu ............................ 99/331 |
| D480,908 | S | 10/2003 | Krasne |
| 6,698,923 | B2 | 3/2004 | Bedetti et al. |
| D488,951 | S | 4/2004 | Josancy |
| 6,730,889 | B1 | 5/2004 | Jones-Lawlor |
| 6,740,855 | B1 | 5/2004 | DeCobert et al. |
| 6,744,019 | B2 | 6/2004 | Takegoshi |
| 6,756,567 | B1 | 6/2004 | Suen |
| 6,818,867 | B2 | 11/2004 | Kressman |
| 6,872,921 | B1 * | 3/2005 | DeCobert et al. ........... 219/441 |
| D503,584 | S | 4/2005 | White et al. |
| 2002/0124737 | A1 | 9/2002 | Bedetti et al. |
| 2003/0173350 | A1 | 9/2003 | Takegoshi |
| 2004/0149729 | A1 | 8/2004 | Kressman |
| 2005/0184048 | A1 | 8/2005 | DeCobert et al. |
| 2006/0207986 | A1 | 9/2006 | Brown |
| 2008/0083730 | A1 | 4/2008 | Dolgov et al. |

FOREIGN PATENT DOCUMENTS

| | | |
|---|---|---|
| EP | 1021979 A1 | 7/2000 |
| EP | 1021979 | 3/2004 |
| EP | 1021979 B1 | 7/2004 |
| FR | 2682272 A1 | 4/1993 |
| GB | 2061091 A | 5/1981 |
| JP | 1037916 A | 2/1989 |
| JP | 5-317164 | 12/1993 |
| JP | 6-327553 | 11/1994 |
| JP | 7-51158 | 2/1995 |
| JP | 7-136059 | 5/1995 |
| JP | 7-241236 | 9/1995 |
| JP | 8-140833 | 6/1996 |
| JP | 10-225373 | 8/1998 |
| JP | 11-137419 | 5/1999 |
| JP | 11-313761 | 11/1999 |
| JP | 2001-70139 | 3/2001 |
| JP | 2001-297865 | 10/2001 |
| JP | 2001-336986 | * 12/2001 |
| JP | 2001336986 | 12/2001 |
| JP | 2002-39546 | 2/2002 |
| JP | 2002046762 | 2/2002 |
| JP | 2003-45630 | 2/2003 |
| WO | WO 03/031876 A1 | 4/2003 |

OTHER PUBLICATIONS

Office Action Issued Jan. 10, 2008 in U.S. Appl. No. 11/363,882.
Office Action Issued Jun. 30, 2008 in U.S. Appl. No. 11/363,882.
Office Action Issued Jan. 16, 2009 in U.S. Appl. No. 11/363,882.
Office Action Issued Jan. 22, 2010 in CN Application No. 200710085805.0.

* cited by examiner

SLOW COOKER

CROSS-REFERENCE TO RELATED APPLICATION

The present application is a continuation of U.S. patent application Ser. No. 11/363,882, filed Feb. 28, 2006 and entitled "Slow Cooker and Method of Operation", the entire subject matter of which is hereby incorporated by reference.

BACKGROUND OF THE INVENTION

The present application is directed to a cooking appliance, generally a slow cooker, for cooking a foodstuff over a period of time and a method for cooking the foodstuff. More particularly, the present application is directed to a slow cooker with a controller mounted to a side of a shell, a plurality of control modes for cooking foodstuff and a method of utilizing a temperature probe for controlling the cooking of the foodstuff in the slow cooker.

Slow cookers are relatively common household or kitchen appliances that are used to cook a foodstuff over a relatively long time period. Conventional slow cookers typically include a base or shell, a crock removably mountable in a basin of the shell and a lid removably mountable to a mouth of the crock. Foodstuff is positioned in the crock, the crock is positioned in the basin, the lid is positioned over the mouth of the crock and the basin is heated at a predetermined, relatively low temperature over an extended period of time to cook the foodstuff. The foodstuff is typically slow cooked at a relatively constant predetermined temperature until the slow cooker is manually turned off by a user. The typical slow cooker controls include a single control dial on a face of the shell including off, low and high settings.

It would be desirable to construct a slow cooker that includes multiple cooking modes for cooking foodstuffs in various cycles and that automatically power down or keep the foodstuff warm at the conclusion of a cooking cycle to generally prevent the foodstuff from overcooking. In addition, it would be desirable to construct a slow cooker with a conveniently mounted controller that is able to control the various cooking cycles and may be accessed for cleaning and/or repair.

BRIEF SUMMARY OF THE INVENTION

Briefly stated, a preferred embodiment of the present invention is directed to a cooking appliance for cooking a foodstuff over a period of time. The cooking appliance includes a shell having a heating cavity and a heating element to heat the heating cavity. A container is removably positionable within the heating cavity and includes a food cavity for receiving the foodstuff. A temperature probe is removably insertable into the foodstuff and a controller is mounted to the shell. The controller controls operation of the cooking appliance in a probe mode wherein the temperature probe is inserted into the foodstuff and transmits foodstuff temperatures to the controller for controlling the heating of the foodstuff. The controller also controls operation of the cooking appliance in a program mode wherein the controller actuates the heating element to heat the container at a temperature for a selected amount of time and subsequently at a lower temperature. The controller further controls operation in a manual mode wherein the controller actuates the heating element to heat the container at a selected temperature.

In another aspect, the present invention is directed to a cooking appliance for cooking a foodstuff over a period of time. The cooking appliance includes a shell having an external wrap and a liner. An air gap is defined between the external wrap and the liner and the external wrap includes an exposed surface and a controller depression. A heating element is secured to the liner and a control panel includes a display face for mounting a controller to the shell. The control panel is mounted in the controller depression such that the display face is positioned one of flush with the exposed surface of the shell and inwardly toward the liner relative to the exposed surface of the shell. The control panel is pivotably mounted to the shell and is sealed to generally prevent fluids from coming into contact with the controller, which is located within the control panel.

In yet another aspect, a preferred embodiment of the present application is directed to a cooking appliance for cooking a foodstuff over a period of time. A shell includes an external wrap and a liner. An air gap is defined between the external wrap and the liner and the external wrap includes a controller depression. A heating element is secured to the liner and a controller is mounted to the shell. The controller actuates the heating element to heat the liner. A control panel includes a living hinge and pivotably mounts the controller in the controller depression.

In a further aspect, the present application is directed to a method of cooking a foodstuff in a kitchen appliance over a period of time. The kitchen appliance includes a shell having a heating cavity, a heating element to heat the heating cavity, a container removably positionable within the heating cavity, a controller to control heating of the heating cavity, a display in communication with the controller, a lid and a temperature probe. The method includes the steps of inserting a foodstuff into the container, positioning the container in the heating cavity, inserting at least a portion of the temperature probe into the foodstuff, selecting a probe set temperature and storing the probe set temperature in the controller, actuating the controller to operate the kitchen appliance in a probe mode, automatically heating the heating cavity at a cooking temperature using the heating element, detecting a foodstuff temperature with the temperature probe, transmitting the foodstuff temperature to the controller, comparing the foodstuff temperature to the probe set temperature using the controller, automatically directing the heating element to heat the heating cavity at a warm temperature when the detected foodstuff temperature is equal to or greater than the probe set temperature and automatically cutting power to the heating element after a maximum time elapses.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings, an embodiment which is presently preferred. It should be understood, however, that the invention is not limited to the precise arrangements and instrumentalities shown.

In the drawings.

DETAILED DESCRIPTION OF THE INVENTION

Figure 1:
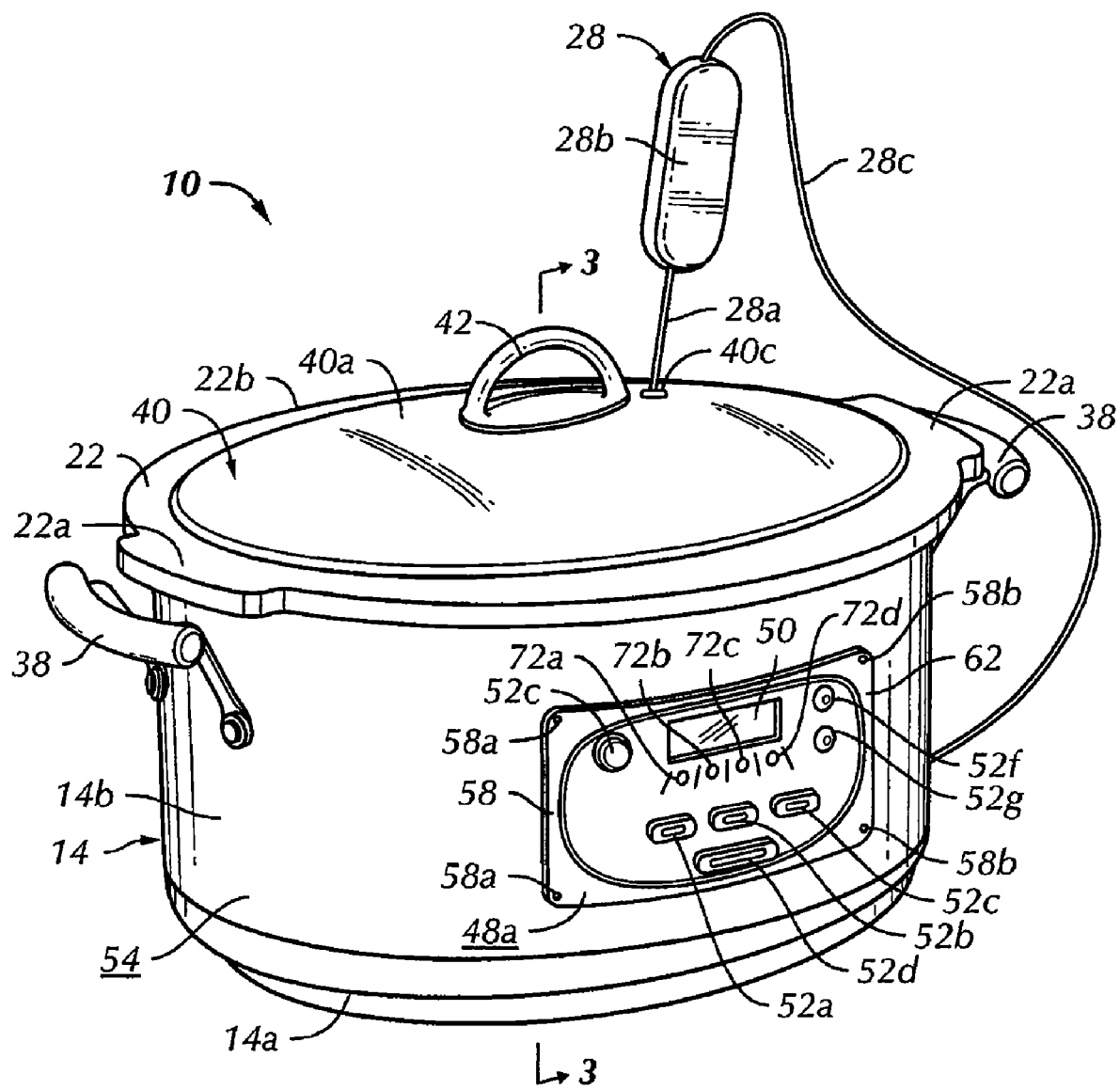
FIG. 1 is a top perspective view of a preferred embodiment of the kitchen appliance or slow cooker of the present invention.

Certain terminology is used in the following description for convenience only and is not limiting. The words, "right", "left", "lower" and "upper" designate directions toward and away from, respectively, geometric center of the kitchen appliance or slow cooker and designated parts thereof. The words "inwardly" and "outwardly" refer to directions toward and away from, respectively, the geometric center of the kitchen appliance or slow cooker and designated parts thereof. The terminology includes the above-listed words, derivatives thereof and words of similar import.

Referring to the drawings wherein like numerals indicate like elements throughout, there is shown in FIGS. 1-6, a preferred embodiment of a kitchen appliance or slow cooker, generally designated 10, for cooking a foodstuff 12 over a period of time.

Figure 2:
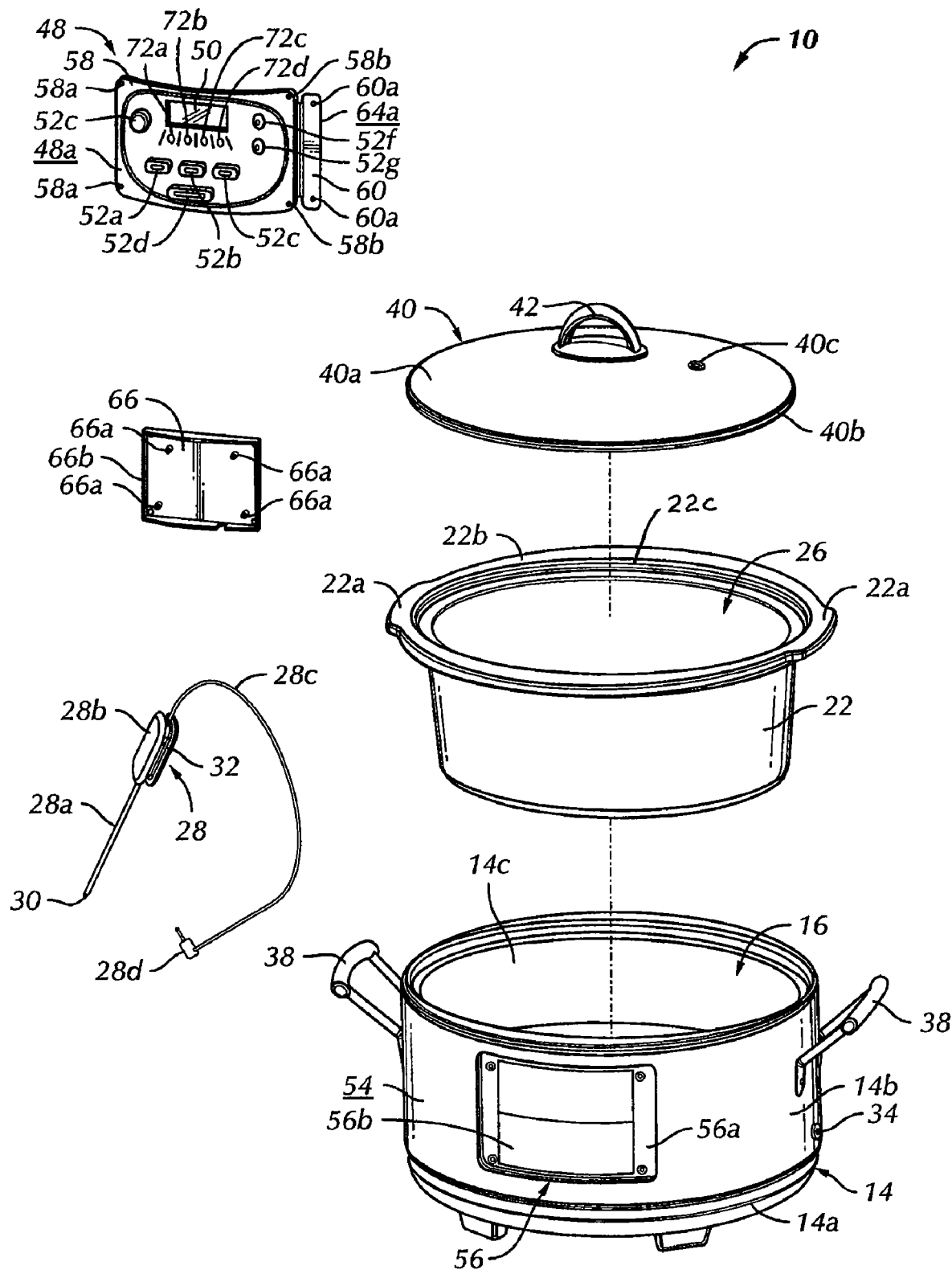
FIG. 2 is a top perspective, partially exploded view of the kitchen appliance, shown in FIG. 1.
Figure 3:
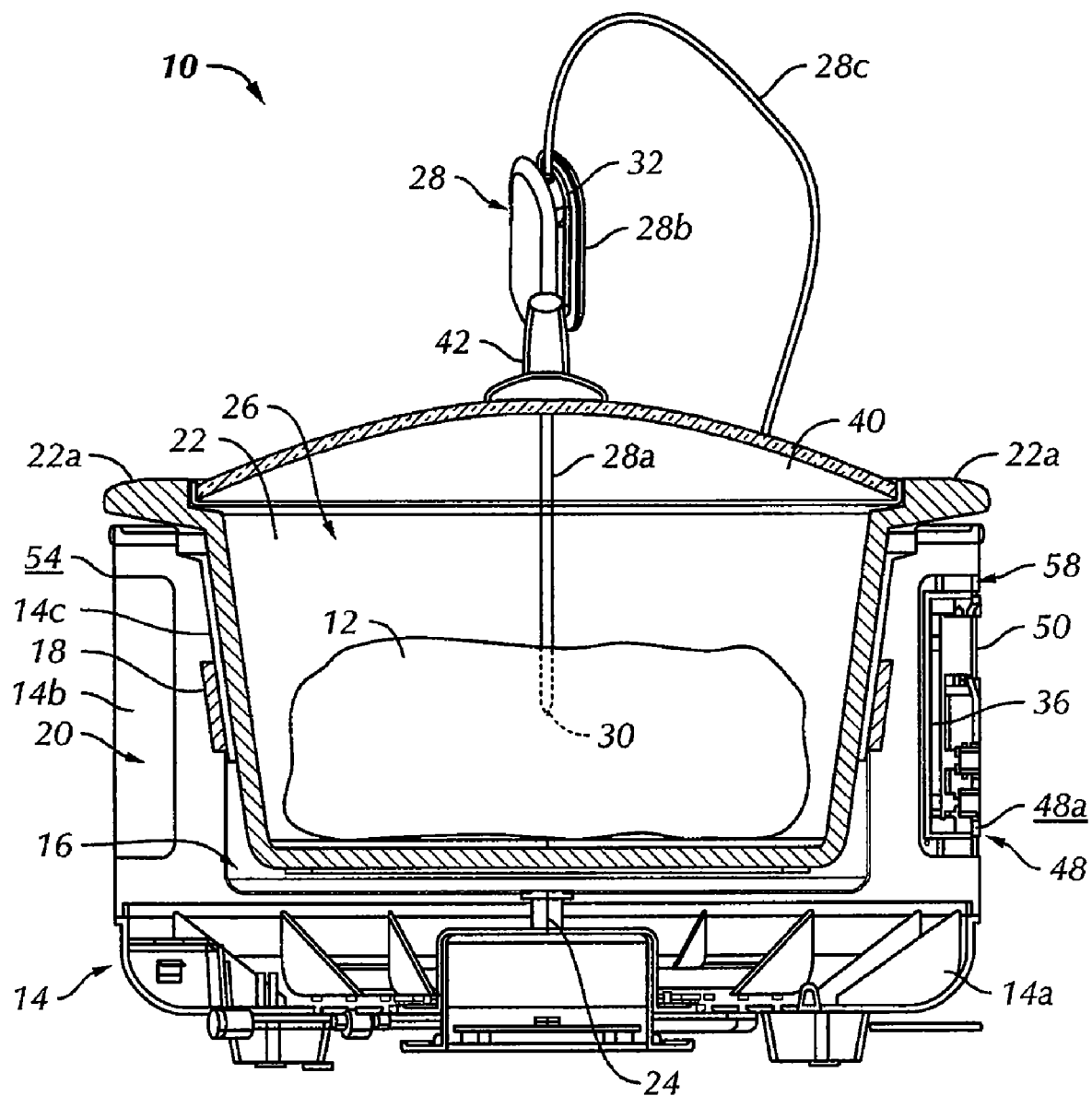
FIG. 3 is a cross-sectional view of the kitchen appliance shown in FIG. 1, taken along line 3-3 of FIG. 1.

Referring to FIGS. 1-3, the kitchen appliance or slow cooker 10 includes a shell 14 having a heating cavity 16 and a heating element 18 to heat the heating cavity 16. In the preferred embodiment, the shell 14 includes a base 14a, an external wrap 14b extending upwardly from the base 14a and a bucket-shaped liner 14c spaced from and positioned within the external wrap. The base 14a is preferably constructed of an injection molded polymeric material and the external wrap 14b and liner 14c are preferably constructed of a metallic material. The base 14a is not limited to being constructed of injection molded polymeric materials and the external wrap 14b and liner 14c are not limited to metallic constructions and may be constructed of nearly any material that is able to take on the general shape of the base 14a, external wrap 14b, and liner 14c and perform the typical functions of these components, respectively. The heating element 18 is wrapped around a side wall of the liner 14c, and, as shown in FIG. 3, preferably positioned between the external wrap 14b and the liner 14c, in the preferred embodiment to heat the liner 14c and the heating cavity 16. The heating element 18 is not limited to be wrapped around the liner 14c and may be mounted to a base of the liner 14c, to an inside surface of the liner 14c or nearly anywhere to the shell 14 for heating of the heating cavity 16.

Referring to FIG. 3, in the preferred embodiment, an air gap 20 is defined by the base 14a, the external wrap 14b and the liner 14c. The heating element 18 is secured to the liner 14c within the air gap 20 and the air gap 20 provides insulation for the liner 14c and the heating cavity 16. Specifically, the air gap 20 insulates the liner 14c and heating cavity 16 when a container or crock 22 is inserted therein, as will be described in greater detail below. The slow cooker 10 is not limited to inclusion of the air gap 20 for insulation purposes and may include alternative insulation between the liner 14c, wrap 14b and base 14a, for example, foam or other types of insulation may be positioned in the air gap 20.

Referring to FIGS. 1-4, in the preferred embodiment, the shell 14 is assembled by positioning a lower edge of the external wrap 14b on an upper rim of the base 14a and engaging an upper peripheral rim of the liner 14c with an upper edge of the external wrap 14b. The liner 14c preferably includes a fastener 24 secured thereto and extending toward the base 14a to secure the liner 14c to the base 14a. The fastener 24 preferably extends through a boss (not shown) in the base 14a and is preferably secured to the base 14a by a nut 24a to sandwich the external wrap 14b between the liner 14c and the base 14a. The fastener 24 secures the assembly of the shell 14 and extends through the air gap 20 in the preferred embodiment. The shell 14 is not limited to being comprised of an assembly of the polymeric base 14a, metallic external wrap 14b and metallic liner 14c secured to each other by the fastener 24 and may be constructed in nearly any manner using nearly any number of components to form the general shape of the shell 14 and withstand the normal operating conditions of the shell 14. In the preferred embodiment, at least two fasteners 24 and nuts 24a are utilized to secure the assembly of the base 14a, external wrap 14b and liner 14c to form the shell 14.

Referring to FIGS. 1-3, the container or crock 22 is removably positionable within the heating cavity 16 and includes a food cavity 26 for receiving the foodstuff 12. The container or crock 22 preferably includes a pair of crock handles 22a on opposing sides and a crock rim 22b at an upper peripheral edge. The crock handles 22a are utilized for carrying the crock 22 and the crock handles 22a and crock rim 22b are utilized for positioning and suspending the crock 22 within the heating cavity 16. Specifically, in the preferred embodiment, the crock handles 22a and crock rim 22b rest on an upper edge of the liner 14c to suspend and locate the crock 22 in the heating cavity 16 in a working or cooking configuration. The container or crock 22 is not limited to inclusion of the opposed crock handles 22a or the crock rim 22b; however, these features are preferred for transporting and locating the crock 22 relative to the shell 14 and the heating cavity 16. The crock 22 is preferably constructed of a ceramic material that is generally able to maintain its temperature when heated for cooking the foodstuff 12, as will be described in greater detail below. The crock 22 is not limited to being constructed of ceramic materials and may be constructed of nearly any material that is able to take on the general size and shape of the crock 22 and withstand the normal operating conditions of the crock 22.

Referring to FIGS. 1-4, the slow cooker 10 includes a temperature probe 28 having at least a portion that is removably insertable into the foodstuff 12. In the preferred embodiment, the temperature probe 28 includes a shaft 28a, a body 28b, a cord 28c and a plug 28d. The shaft 28a preferably extends from the body 28b and includes a probe tip 30 at a distal end. The cord 28c preferably extends from an opposite end of the body 28b relative to the shaft 28a and the plug 28d is preferably mounted to a distal end of the cord 28c. The temperature probe 28 is preferably able to measure temperatures at the probe tip 30 and transmit the temperatures to the plug 28d. In addition, the body 28b is preferably constructed of an insulative polymeric material and the shaft 28a is preferably constructed of a metallic material. The body 28b is generally utilized for grasping by a user and generally does not transmit heat from the shaft 28a into the body 28b due to the insulative properties of the polymeric material. The body 28b is not limited to being constructed of the insulative polymeric material and the shaft 28a is not limited to being constructed of a metallic material. The body 28b and shaft 28a may be constructed of nearly any material that is able to take on the general shape of the body 28b and shaft 28a and perform the typical functions of the body 28b and shaft 28a.

Referring to FIGS. 2 and 3, the body 28b also preferably includes a cord groove 32 around its periphery that the cord 28c extends from and may be wrapped within in a storage configuration (not shown). The cord groove 32 is convenient for a user to store the cord 28c in close proximity to the body 28b such that the cord 28c is not constantly extended from the body 28b. In the preferred embodiment, at least one plug storage hole 32a is located within the cord groove 32 that removably receives the plug 28d therein for storage of the plug 28d proximate the body 28b. The preferred temperature probe 28 preferably includes two plug storage holes 32a on each side of the body 28b in the cord groove 32 that are integrally formed in the body 28b for removable receipt of the plug 28d. In the preferred embodiment, the plug storage holes 32a are formed in the body 28b within the groove 32 such that the plug 28d may be force fit into the relatively elastic material of the body 28b within the plug storage holes 32a. The body 28b is not limited to inclusion of the cord groove 32 or to the four plug storage holes 32a and may have a generally smooth, continuous outer surface; however, the cord groove 32 and plug storage holes 32a are preferred for storage of the cord 28c proximate the body 28b.

Figure 6:
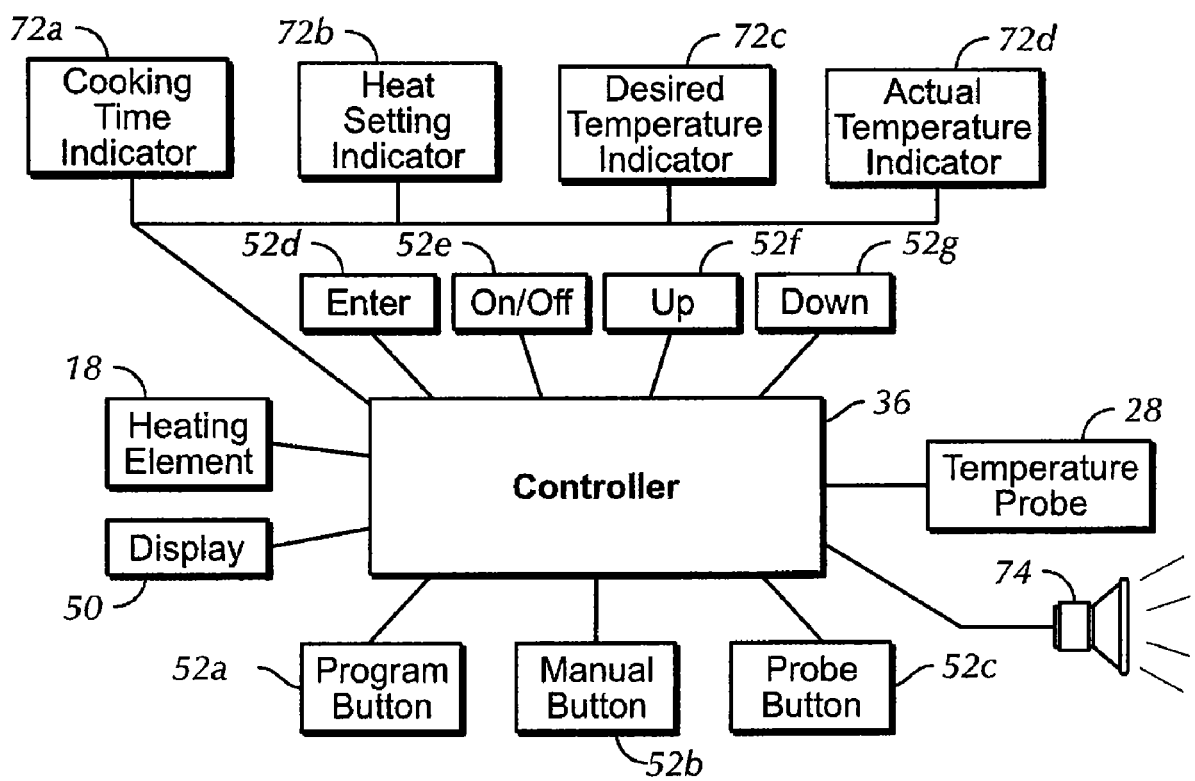
FIG. 6 is a schematic block diagram of a controller and related components of the kitchen appliance shown in FIG. 1.
Figure 5:
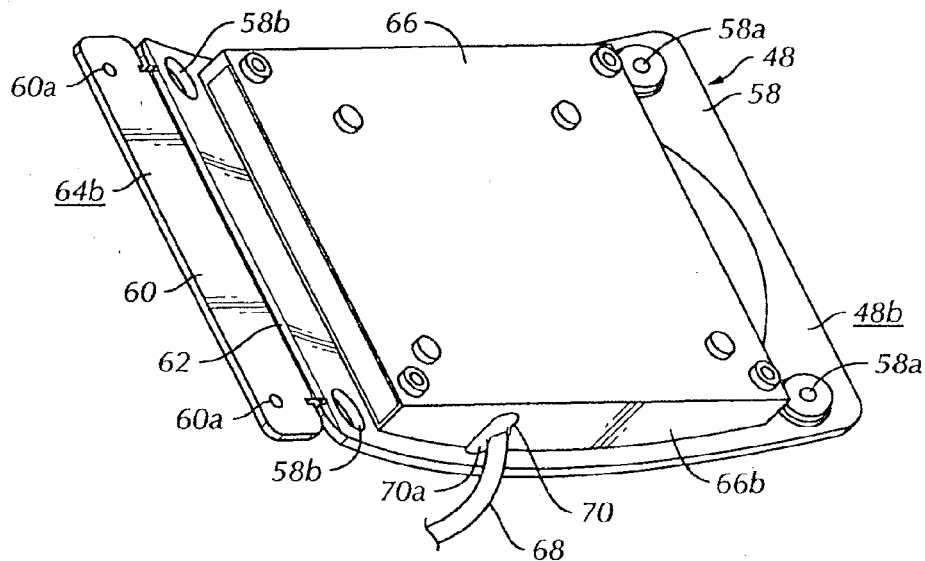

Referring to FIGS. 2 and 6, in the preferred embodiment, a probe outlet 34 is exposed on a side surface of the shell 14 and the plug 28d is removably insertable into the probe outlet 34 to establish communication between a controller 36, as will be described in greater detail below, and the temperature probe 28. The probe outlet 34 is preferably formed in the external wrap 14b and permits removable securing or plugging of the plug 28d into the probe outlet 34. The probe outlet 34 is not limited to being located in the external wrap 14b or to removably securing or plugging of the plug 28d therein. For example, the temperature probe 28 may be permanently secured to the shell 14 by the cord 28c, which extends from the base 14a or may remotely communicate (such as wirelessly) with the controller 36 to transmit temperatures from the probe tip 30 to the controller 36 without the need for the cord 28c. However, the temperature probe 28 including the cord 28c and plug 28d that is removably securable in the probe outlet 34 to establish communication with the controller 36 is preferred due to the typical reliability of the cord 28c, plug 28d and probe outlet 34 in establishing communication between the temperature probe 28 and the controller 36.

In the preferred embodiment, a pair of U-shaped handles 38 is mounted to opposing sides of the shell 14. In the preferred embodiment, the handles 38 are bolted to side surfaces of the external wrap 14b generally at a middle of a height of the wrap 14b. The handles 38 are preferably constructed of a metallic material and include a polymeric grip for user comfort. The cooking appliance or slow cooker 10 is not limited to inclusion of the U-shaped handles 38 constructed of a metallic material having the polymeric grips and may be constructed of nearly any material and have nearly any shape that allows the user to transport or carry the slow cooker 10. In addition, the handles 38 may be eliminated from the slow cooker 10 without having a significant impact on the operation of the slow cooker 10. However, the handles 38 are preferred for moving or transporting the slow cooker 10.

Referring to FIGS. 1-3, in the preferred embodiment, a lid 40 is removably mountable to a mouth 22c (FIG. 2) of the container or crock 22. The preferred lid 40 is constructed of a transparent, glass panel 40a and a metallic rim 40b at the peripheral edge of the panel 40a. The panel 40a is preferably transparent or translucent such that a user is able to view foodstuff 12 within the crock 22 and includes the metallic rim 40b to improve the durability of the lid 40 and generally limit chipping or cracking of the panel 40a at its peripheral edge. The lid 40 is not limited to being constructed of a glass, transparent or translucent panel 40a with a metallic rim 40b and may be constructed of nearly any assembly or material that is able to take on the general shape of the lid 40 and perform the typical functions of the lid 40. For example, the lid 40 may be constructed of a single-piece, opaque material that is removably mountable to the mouth 22c of the crock 22.

In the preferred embodiment, the lid 40 includes a probe hole 40b extending therethrough that removably receives the shaft 28a of the temperature probe 28 for removable mounting of the temperature probe 28 to the lid 40. The probe hole 40c permits insertion of the shaft 28a therethrough such that the probe tip 30 may be inserted into the foodstuff 12 in the cooking configuration with the lid 40 in place covering the crock 22. The preferred probe hole 40c includes a polymeric gasket inserted therein such that the shaft 28a is slideably received in the probe hole 40c to generally protect the glass panel 40a. The probe hole 40c is not limited to inclusion of the gasket nor to inclusion in the lid 40. For example, a similar hole may be inserted in the crock 22 such that the probe tip 30 may be inserted into the foodstuff 12 in the cooking configuration or the temperature probe 28 may be otherwise configured to be permanently secured to a base of the crock 22 such that the foodstuff 12 is inserted or mounted upon the temperature probe (not shown) when it is inserted into the crock 22.

Referring to FIGS. 1-3, in the preferred embodiment, the lid 40 includes a gripping knob 42 mounted in a generally central position on a top surface of the transparent panel 40a. The gripping knob 42 permits transporting of the lid 40 for removably mounting on the mouth 22c of the crock 22. The gripping knob 42 is preferably constructed of an injection molded polymeric material that is secured to the transparent panel 40a. The gripping knob 42 is not limited to injection molded polymeric constructions or to being included with the lid 40. For example, the lid 40 may include no gripping knob 42 or other handle; however, the gripping knob 42 is preferred for convenient removal and replacement of the lid 40 onto the crock 22.

Figure 4:
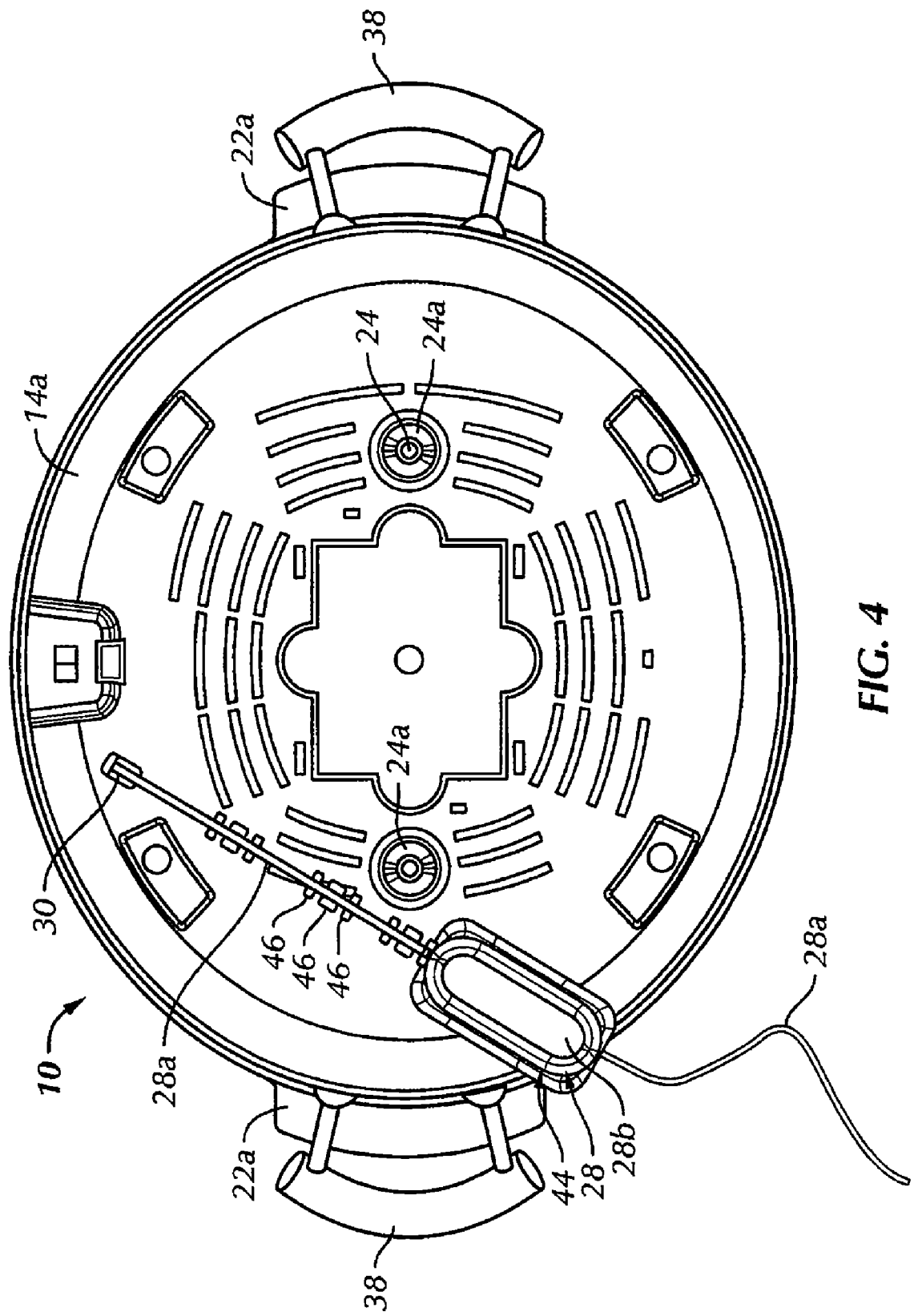
FIG. 4 is a bottom plan view of the kitchen appliance shown in FIG. 1.

Referring to FIGS. 3 and 4, in the preferred embodiment, a probe storage cavity 44 is located in a bottom surface of the shell 14. The probe storage cavity 44 is preferably shaped and sized for removably receiving the temperature probe 28 when the temperature probe 28 is in a storage position. The probe storage cavity 44 is preferably formed in the base 14a and includes one or more shaft locks 46. The temperature probe 28 may be stored in the storage position in the probe storage cavity 44 by engaging the shaft 28a with the shaft locks 46 and inserting the probe body 28b into the probe storage cavity 44. The shaft locks 46 preferably receive the shaft 28a in a force-fit or snap-lock manner, as is generally well known to one having ordinary skill in the art. When the temperature probe 28 is in the storage position, the temperature probe 28 is generally out of the way and attached to the slow cooker 10 to generally prevent loss of the temperature probe 28. The cooking appliance or slow cooker 10 is not limited to inclusion of the probe storage cavity 44 or the shaft locks 46 and may be constructed without these components without significantly impacting the operation and construction of the slow cooker 10.

Referring to FIGS. 1-3, 5 and 6, the controller 36 is mounted to the shell 14 for controlling operation of the cooking appliance or slow cooker 10 in several cooking modes. In the preferred embodiment, the controller 36 is comprised of a programmable controller and may be comprised of an application-specific integrated circuit (ASIC) that controls operation of the slow cooker 10 in at least, probe, manual and program modes. The controller 36 is not limited to being comprised of the programmable controller or the ASIC and may be comprised of nearly any variety of controller, such as a microprocessor, that is able to control the slow cooker 10, as will be described in greater detail below, and withstand the normal operating conditions of the slow cooker 10.

The controller 36 controls the slow cooker 10 in the probe mode wherein the temperature probe 28 is inserted into the foodstuff 12 and transmits foodstuff temperatures to the controller 36 for controlling the heating of the foodstuff 12, the program mode wherein the controller 36 actuates the heating element 18 to heat the container or crock 22 at a selected temperature for a selected amount of time and subsequently at a lower temperature and the manual mode wherein the controller 36 actuates the heating element 18 to generally, continuously heat the container or crock 22 at a selected temperature. The operation of the slow cooker 10 in the probe mode, program mode and manual mode will be described in greater detail below.

In the preferred embodiment, a control panel 48 for mounting the controller 36 to the shell 14 includes a display 50 and a plurality of control buttons 52a, 52b, 52c, 52d, 52e, 52f, 52g. Each of the control buttons 52a, 52b, 52c, 52d, 52e, 52f, 52g is in communication with the controller 36 for directing the controller or programmable controller 36 to control the slow cooker 10 in one of the modes or to perform other related functions. In the preferred embodiment, the control buttons 52a, 52b, 52c, 52d, 52e, 52f, 52g include at least one of a probe button 52a, a manual button 52b, a program button 52c, an enter button 52d, an on/off button 52e, an increase or up button 52f and a decrease or down button 52g. The utilization of the control buttons 52a, 52b, 52c, 52d, 52e, 52f, 52g and operation of the programmable controller 36 relative to inputs from the control buttons 52a, 52b, 52c, 52d, 52e, 52f, 52g will be described in greater detail below.

Referring to FIGS. 1-3 and 5, the external wrap 14b includes an exposed surface 54 and a controller depression 56. In the preferred embodiment, the controller depression 56 includes a peripheral shelf 56a that is preferably depressed from the exposed surface 54 of the external wrap 14b and a controller hole 56b that is preferably comprised of a generally rectangular hole through the external wrap 14b exposing the air gap 20. The controller depression 56 is not limited to the shelf 56a and the controller hole 56b, is not limited to the configuration as is shown in the attached figures, and may be comprised of nearly any feature that is able to perform the functions of the controller depression 56, as will be described in greater detail below.

Referring to FIGS. 1-3, the control panel 48 mounts the controller 36 to the shell 14 and includes a display face 48a. The control panel 48 is preferably mounted in the controller depression 56 such that the display face 48a is positioned generally flush with the exposed surface 54 of the shell 14 or at least slightly inwardly toward the liner 14c relative to the exposed surface 54. Positioning the display face 48a relatively flush with or inwardly relative to the exposed surface 54 provides a generally clean, smooth appearance for the exposed surface 54 of the external wrap 14b of the shell 14 and the display face 48a and the overall appearance of the slow cooker 10. Such a smooth, continuous appearance for the slow cooker 10 is desirable for the aesthetic appearance of the slow cooker 10. In addition, mounting the display face 48a generally flush with or inwardly relative to the exposed surface 54 provides relatively easy access to the control buttons 52a, 52b, 52c, 52d, 52e, 52f, 52g on the display face 48a of the control panel 48 for the user.

Referring to FIGS. 1-3 and 5, the control panel 48 is preferably, pivotably mounted to the shell 14 and is sealed to generally prevent fluids from coming into contact with the controller 36, which is located within the control panel 48. In the preferred embodiment, the control panel 48 includes a display panel 58, a hinge panel 60 and a hinge 62 mounting the display panel 58 to the hinge panel 60. The control panel 48 is preferably constructed of an injection molded polymeric panel including the display panel 58, the hinge panel 60 and the hinge 62, which is preferably a living hinge. The control panel 48 is not limited to constructions utilizing injection molded polymeric materials or to inclusion of the living hinge 62. For example, the display panel 58 and hinge panel 60 may be constructed of a sheet metal material secured together by a butterfly-type hinge (not shown). The control panel 48 may be constructed of nearly any material that is able to take on the general shape of the control panel 48 and perform the typical functions of the control panel 48, as will be described in greater detail below.

In the preferred embodiment, the hinge panel 60 includes a first mounting hole 60a therein and the display panel 58 includes a second mounting hole 58a and a clearance hole 58b therein. Preferably, the hinge panel 60 includes a pair of first mounting holes 60a and the display panel 58 includes a pair of second mounting holes 58a and a pair of clearance holes 58b. The first and second mounting holes 60a, 58a, preferably have a smaller diameter than the clearance holes 58b. The second mounting holes 58a and the clearance holes 58b are preferably located at opposing corners of the generally rectangular display panel 58 and the first mounting holes 60a are preferably mounted to upper and lower portions of the hinge panel 60. The control panel 48 is not limited to the inclusion of pairs of first and second mounting holes 60a, 58a and pairs of clearance holes 60 and may include single first and second mounting holes 60a, 58a, and a single clearance hole 58b or may include a plurality of first and second mounting holes 60a, 58a, and clearance holes 58b, which are located at nearly any portion of the control panel 48 for securing the control panel 48 to the external shell 14b in the controller depression 56, as will be described in greater detail below.

Figure 5:
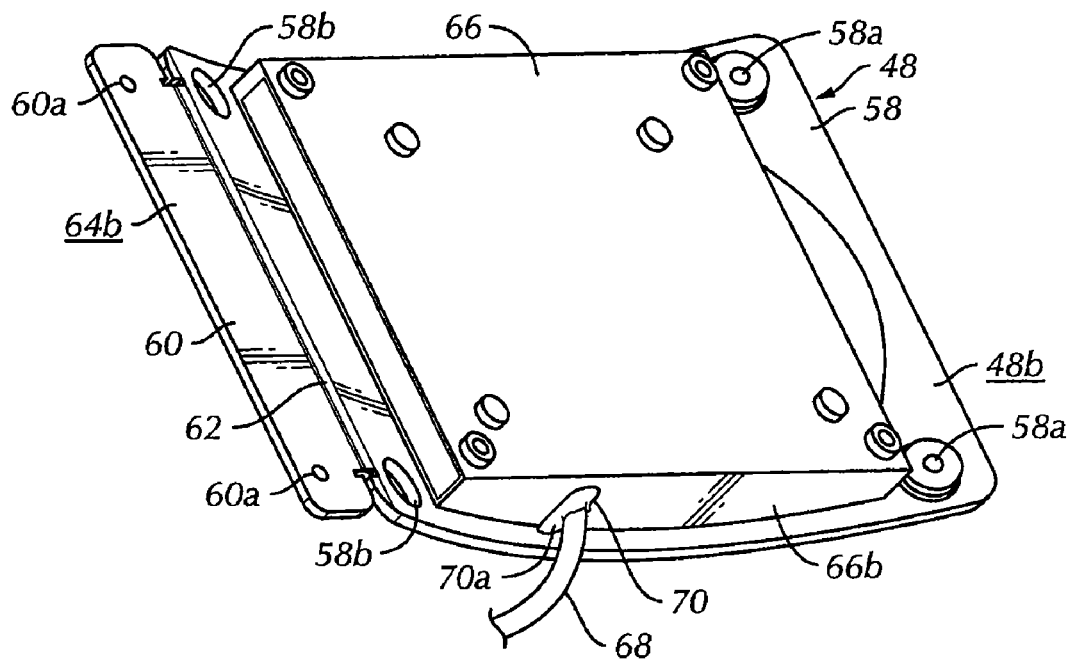
FIG. 5 is a rear perspective view of a control panel of the kitchen appliance shown in FIG. 1.

Referring to FIGS. 2 and 5, in the preferred embodiment, the hinge panel 60 includes a first face 64a and a second face 64b and the display panel 58 includes an internal face 48b and the display face 48a. A portion of the internal face 48b and the first face 64a are in facing engagement with the shelf 56a in an assembled configuration. Specifically, in the assembled configuration, the hinge panel 64 is pivoted about the hinge 62 such that the first face 64a is facing the shelf 56a along with the internal face 48b and the control panel 48 is mounted in the controller depression 56. Mounting of the control panel 48 in the controller depression 56 in this manner permits the above-described flush or radially inwardly positioning of the display face 48a relative to the exposed surface 54 of the external wrap 14b in the assembled configuration. As was described above, this type of mounting provides a generally smooth, continuous surface between the display face 48a and the exposed surface 54, which is generally aesthetically pleasing to a user of the slow cooker 10 and typically prevents grease or other spillage from becoming stuck in rough or extending surfaces at the exposed surface 54 of the external wrap 14b.

Referring to FIGS. 1, 2 and 5, in the preferred embodiment, the hinge panel 60 is pivoted about the hinge 62 such that the second face 64b is in facing engagement with the internal surface 48b in a mounting position, when the control panel 48 is prepared for mounting in the controller depression 56 and when the control panel 48 is mounted to the external wrap 14b in the assembled configuration. In the mounting position and the assembled configuration, the clearance holes 58b align with the first mounting holes 60a. In addition, in the assembled configuration, a first fastener (not shown) extends through the clearance hole 58b and the first mounting hole 60a and a second fastener (not shown) extends through the second mounting hole 58a to mount the control panel 48 to the shell 14, specifically, to the external wrap 14b within the controller depression 56. The heads (not shown) of the first and second fasteners preferably engage the hinge panel 60 proximate the first mounting holes 60a and the display panel 58 proximate the second mounting holes 58a. The clearance holes 58b provide clearance for the heads of the first fasteners to extend completely through the display panel 58 to engage the second face 64b of the hinge panel 60. Accordingly, in the assembled configuration, the second fasteners may be removed from the second mounting holes 58a such that the display panel 58 may be pivoted about the living hinge 62 to provide access to the internal face 48b of the control panel 48 for maintenance of the controller 36, for cleaning of the shelf 56a or potentially for access to the air gap 20 and liner 14c. The control panel 48 is not limited to being mounted or secured to the shell 14 by fasteners and may be clamped, adhesively bonded or otherwise secured to the shell 14.

Referring to FIGS. 2 and 5, in the preferred embodiment, a cover 66 is removably mounted to the internal face 48a of the display panel 58 and the controller 36 is mounted between the display panel 58 and the cover 66. Preferably, the cover 66 includes side walls 66b and screw bosses 66 that space the cover 66 from the internal face 48b and provide a space for mounting the controller 36 between the cover 66 and the internal face 48b. The cover 66 and display panel 58 generally provide protection for the controller 36 and provide a relatively sturdy mount for the controller 36. The control panel 48 is not limited to inclusion of the cover 66 any may be otherwise configured or assembled to provide protection for the controller 36 and to mount the controller 36.

Referring to FIGS. 2 and 5, in the preferred embodiment, an electrical cord 68 is in communication with the controller 36 within the control panel 48 and the cover 66 includes a cord hole 70 to provide access for the electric cord 68 to the controller 36. A sealant 70a preferably seals the cord hole 70 with the electrical cord 68 therein in an assembled configuration to generally prevent fluids from coming into contact with the controller 36, which is mounted within the control panel 48. The cover 66 is not limited to inclusion of the cord hole 70 and the cord hole 70 is not limited to being sealed by the sealant 70a in the assembled configuration. For example, the cord hole 70 may be positioned in a rear face of the cover 66 to provide power and other communications to the controller 36 and may be sized for a force fit of the electrical cord 68 therein to generally seal and prevent a significant amount of fluid from coming into contact with the controller 36. The controller 36 is preferably sealed within the control panel 48 to generally prevent contact with fluids as exposure to fluids may have an adverse impact upon the function of the controller 36.

Referring to FIGS. 1-3 and 5, in the preferred embodiment, the user may manipulate the control panel 48 to gain access to the internal face 48b or to the air gap 20 and liner 14c. Specifically, the user may remove the second fasteners from the second mounting holes 58a and pivot the display panel 58 out of the controller depression 56 about the living hinge 62. The user may then clean the rear of the control panel 48 or the shelf 56a or may gain access to the controller 36 by removing the cover 66. For example, the user may modify the controller 36 to perform various alternative functions when gaining access to the controller 36. The control panel 48 may then be pivoted back to the assembled configuration for further use of the slow cooker 10.

Referring to FIGS. 1-6, to operate the slow cooker 10 in any of the cooking modes, uncooked foodstuff 12 is positioned in the crock 22, the crock 22 is positioned in the heating cavity 16 and the lid 40 is positioned over the mouth 22c of the crock 22. The slow cooker 10 is powered and a user presses the on/off button 52e. When the on-off button 52e is depressed, the display 50 prompts a user to select a cooking mode by showing the word, "SEL".

Probe Mode

Referring to FIGS. 1-3 and 6, to operate the slow cooker 10 in the probe mode, the tip 30 of the temperature probe 28 is inserted directly into the foodstuff 12 to be consumed through the probe hole 40c in the lid 40, a probe set temperature (i.e., desired temperature) is selected by a user and stored in the controller 36, the controller 36 actuates the slow cooker 10 to operate in the probe mode, the controller 36 automatically heats the heating cavity 16 at a cooking temperature using the heating element 18, a foodstuff temperature (i.e., actual temperature) is detected with the temperature probe 28, the foodstuff temperature is transmitted to the controller 36, the foodstuff temperature is compared to the probe set temperature using the controller 36, the heating element 18 is automatically directed to heat the heating cavity 16 at a warm temperature when the detected foodstuff temperature is equal to or greater than the probe set temperature and power is automatically cut to the heating element 18 after a maximum time elapses. The probe mode is preferably utilized to cook a foodstuff 12, such as a roast, whole chicken or other foodstuff to a recommended internal or foodstuff temperature.

In the preferred embodiment, the user may select a low or high heat setting when the temperature probe 28 is inserted into foodstuff for cooking using the heating element 18. The user is also preferably able to select the probe set temperature using the control buttons 52a-52g. In the preferred embodiment, the probe set temperature may be selected in the range of 140 to 180 degrees Fahrenheit (140° F.-180° F.). The probe set temperature is selected by depressing the up and/or down buttons 52f, 52g when the slow cooker 10 is in the probe mode and the up and down buttons 52f, 52g preferably increment the selected probe set temperature by five degrees Fahrenheit (5° F.). The temperature settings may also be displayed on the display 50 in degrees Centigrade (° C.) as well as degrees Fahrenheit (° F.).

In the preferred embodiment, in the probe mode, the plug 28d is engaged with the probe outlet 34 and the shaft 28a of the temperature probe 28 is inserted into the food cavity 26 through the probe hole 40c such that the probe tip 30 is positioned within the foodstuff 12. The probe tip 30 is preferably located proximate a center of the foodstuff 12. The slow cooker 10 is powered and a user depresses the on/off button 52b. The probe button 52c is depressed by the user after being prompted by the word, "SEL" on the display 50 and the controller 36 illuminates a light emitting diode (LED) on or proximate to the probe button 52c to indicate to the user that the slow cooker 10 is operating in the probe mode, illuminates a cook time indicator 72a beneath the display 50 and displays the word, "HIGH" on the display 50. The user may then depress the up or down buttons 52f, 52g to toggle between the words, "HIGH" and "LOW" on the display 50, indicating that the heating element 18 will be actuated to heat the heating cavity 16 at a high or low temperature. When the desired temperature indication is present on the display 50, the user depresses the enter button 52d to accept the desired heat setting.

When the desired heat setting is selected, the controller 36 illuminates a desired temperature indicator 72c below the display 50 and displays the number, "160" on the display 50. The user is preferably able to depress the up or down buttons 52f, 52g to modify the desired food temperature or the probe set temperature in 5 degree Fahrenheit (5° F.) increments in a range between 140 and 180 degrees Fahrenheit (140° F.-180° F.). When the desired food set temperature or probe set temperature is displayed on the display 50, the user depresses the enter button 52d and the controller 36 directs the heating element 18 to heat the heating cavity 16 at the selected high or low temperature.

In the preferred embodiment, when the enter button 52d is depressed at the conclusion of the selections in the probe mode, the display 50 shows the word "COOK" for a relatively brief amount of time, sounds a brief tone from a speaker 74 associated with the controller 36, energizes the heating element 18 to heat the heating cavity 16 at the selected temperature, illuminates an actual temperature indicator 72d below the display 50, displays a measured food temperature on the display 50 received from the temperature probe 28 for a brief amount of time and subsequently illuminates a desired temperature indicator 72c while displaying a desired temperature or the probe set temperature on the display 50 for a brief amount of time. The actual measured temperature from the temperature probe 28 and the desired temperature or probe set temperature are repeatedly shown on the display 50 for short periods of time until the actual temperature of the foodstuff 12 is equal to or greater than the desired or probe set temperature.

When the actual temperature of the foodstuff 12 measured by the temperature probe 28 is equal to or greater than the desired or probe set temperature stored in the controller 36, the controller 36 actuates the speaker 74 to sound a tone, actuates the display 50 to show the word, "WARM", turns off the actual temperature indicator 72d and illuminates a heat setting indicator 72b. The controller 36 may actuate the speaker 74 to sound nearly any sound, however, in the preferred embodiment, the speaker 74 is actuated to emit three short tones having a duration of one second (1 s) each and spaced by one second (1 s) silences. In addition, in the preferred embodiment, the repeated display of the actual foodstuff and probe set temperatures on the display 50 are displayed for five second (5 s) intervals. The tones from the speaker 54 and dwell of the displays on the display 50 are not limited to the above-described time limitations and may be displayed or emitted in nearly any manner, as will be understood by one having ordinary skill in the art.

In the preferred embodiment, in the probe mode, the controller 36 automatically actuates the heating element 18 to heat the heating cavity 16 at a warm setting or temperature that is lower than both the low and high temperatures, which are generally utilized for cooking, when the foodstuff measured temperature is detected as being equal to or greater than the probe set temperature. In addition, the controller 36 preferably directs the heating element 18 to heat the heating cavity 16 for a total of fourteen hours (14 hrs) in the probe mode and cuts power to the heating element 18 after fourteen hours has elapsed. When the maximum time period is reached, the controller 36 preferably sounds three tones from the speaker 74 and directs the display 50 to show the word, "OFF". The slow cooker 10 is not limited to turning the heating element 18 off after a maximum of fourteen hours or to indicating the off condition as was described above in the probe mode. For example, the controller 36 may actuate the heating element 18 to maintain the warm temperature for an infinite amount of time or for nearly any maximum amount of time, as will be understood by one having ordinary skill the art.

It is preferred that the controller 36 provide some indication to a user if the temperature probe 28 falls out of communication with the controller 36 during operation of the slow cooker 10 in the probe mode. For example, if the plug 28d becomes detached from the probe outlet 34, the controller 36 preferably actuates the display 50 to show the phrase "PLUG PRBE", sounds a three second (3 s) continuous tone using the speaker 74, actuates the heating element 18 to heat the heating cavity 16 at the high temperature setting and monitors communication from the temperature probe 28 to determine if or when the temperature probe 28 comes back into communication with the controller 36. When the temperature probe 28 comes back into communication with the controller 36, for example, when the plug 28d is reinserted into the probe outlet 34, the controller 36 continues cooking in the probe mode in the previously selected cycle. The controller 36 is not limited to operating in the above-described manner if communication is lost to the temperature probe 28 and may simply cut power to the heating element 18 if communication is lost with the temperature probe 28, direct the heating element 18 to heat the heating cavity 16 at the warm temperature or otherwise react to a cut in communication between the controller 36 and the temperature probe 28.

At the conclusion of cooking the foodstuff 12 in the probe mode, the temperature probe 28 is removed from the lid 40 and cleaned, the lid 40 is removed from the crock 22 and the foodstuff 12 may be removed from the crock 22 for consumption or the crock 22 may removed from the heating cavity 16 to store the cooked foodstuff 12 or to transport the cooked foodstuff 12 to a serving dish. The crock 22, lid 40 and shell 14 may then be cleaned and the cord 28c is preferably wrapped around the body 28b within the cord groove 32 for storage. In addition, the plug 28d may be inserted into any one of the plug storage holes 32a to retain the plug 28d proximate the body 28b in a storage configuration. The temperature probe 28 is then preferably positioned in the probe storage cavity 44 such that the shaft locks 46 engage the shaft 28a to secure the temperature probe 28 to the base 14a. The cleaned slow cooker 10 may then be placed in storage or prepared for additional cooking.

Program Mode

To operate the slow cooker 10 in the program mode, the slow cooker 10 is powered and a user presses the on/off button 52e. The program button 52d is depressed by a user upon prompting from the display 50 and the controller 36 automatically illuminates an LED (not shown) on or proximate the program button 52d to indicate that the slow cooker 10 is in the program mode. The controller 36 then automatically illuminates a cooking time indicator 72a and automatically shows the phrase "4:00" on the display 50. This indicates that the default cooking time is four hours (4 hrs) for the program mode, which may be modified by depressing the up and/or down buttons 52f, 52g in thirty minute increments (30 min) in a preferred range between thirty minutes and twelve hours (12 hrs). The slow cooker 10 is not limited to the four hour default time or to the thirty minute to twelve hour cooking time range. The cooking time range and default may be nearly any time period, as will be understood by one having ordinary skill in the art. The user selects the desired cooking time shown on the display 50 by depressing the enter button 52d.

After the cooking time has been accepted, the controller 36 automatically illuminates the heat setting indicator 72b and displays the word, "HIGH" on the display 50. The heat setting is preferably able to be modified by depressing the up and/or down buttons 52f, 52g to toggle between high and low temperature settings, which are accepted by depressing the enter button 52d. The slow cooker 10 is not limited to toggling between high and low temperature settings and may include additional temperature settings or only a single temperature setting.

When the enter button 52d is depressed to select the desired temperature setting, the controller 36 automatically displays the word, "COOK" for a short period of time, sounds a tone using the speaker 74, energizes the heating element 18 to heat the heating cavity 16 at the selected temperature setting, illuminates the cooking time indicator 72a and displays the cooking time that is remaining on the display 50. The display 50 preferably repeatedly shows the cooking time that is remaining and the selected temperature setting for short periods of time, preferably five second (5 s) intervals. The foodstuff 12 is cooked at the selected temperature setting for the selected amount of time and when the time has elapsed, the controller 36 automatically sounds a tone using the speaker 74. The controller 36 then indicates the word, "WARM" on the display 50, turns off the cooking time indicator 72a and illuminates the heat setting indicator 72b. The controller 36 also actuates the heating element 18 to heat the heating cavity 16 at a warm temperature that is lower than either the low or high cooking temperatures. The controller 36 preferably continues to maintain the warm temperature for a maximum time of fourteen hours at which point the controller 36 automatically cuts power to the heating element 18, sounds a tone using the speaker 74 and actuates the display 50 to show the word, "OFF". The controller 36 is not limited to controlling the slow cooker 10 in the above-described manner in the program mode and may alternatively control the slow cooker 10 in the program mode, as will be understood by one having ordinary skill in the art.

Manual Mode

To operate the slow cooker 10 in the manual mode, the on/off button 52e is depressed and the display 50 shows the word, "SEL", prompting the user to select a cooking mode. The user depresses the manual button 52b and the controller 36 automatically illuminates an LED on or proximate the manual button 52b, illuminates the heat setting indicator 72b and shows the word, "HIGH" on the display 50. The selected cooking temperature may be modified by depressing the up and/or down buttons 52f, 52g to toggle between high, low and warm temperatures, which are each displayed on the display 50. As was described above, the slow cooker 10 is not limited to the high, low and warm temperatures for cooking and/or warming and may toggle between a series of numerical temperature settings or other, like alternative temperature settings.

When the user depresses the enter button 52d, the controller 36 displays the word, "COOK" on the display 50, if the high or low temperature settings are selected or the display 50 shows the word, "WARM" if the warm setting is selected, sounds a tone using speaker 74 and energizes the heating element 18 to heat the heating cavity 16 at the cooking or temperature setting that was selected after a short delay. The display 50 preferably repeatedly shows the selected temperature setting ("HIGH" OR "LOW") and the word, "COOK" for short periods of time or shows the word, "WARM" if the warm setting is selected. The slow cooker 10 preferably operates or cooks in this manner for a maximum amount of time and the controller 36 preferably cuts power to the slow cooker 10 after the maximum time has elapsed. In the preferred embodiment, the maximum time is fourteen hours (14 hrs), but the fourteen hour maximum time is not limiting and may comprise nearly any time that may be controlled by the controller 36. In addition, the user may modify the cooking temperature by depressing the up and/or down buttons 52f, 52g during cooking in program mode, which will preferably not impact the maximum time period for cooking, but will modify the temperature that the heating element 18 heats the heating cavity 16.

When the maximum time has elapsed, the controller 36 preferably sounds a tone using the speaker 74, shows the word, "OFF" on the display 50 and turns off the LED on or proximate the manual button 52b. The food may be removed from the crock 22 for consumption and the components of the slow cooker 10 may be cleaned and stored as was described above.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A slow cooker for cooking a foodstuff over a period of time, the slow cooker comprising:
 a shell including a base, an external wrap extending upwardly from the base, a liner spaced from and positioned within the external wrap, and a heating cavity;
 a heating element positioned between the external wrap and the liner to heat the heating cavity;
 a container removably positionable within the heating cavity, the container including a food cavity for receiving the foodstuff;
 a temperature probe removably insertable into the foodstuff; and
 a controller mounted to the shell, the controller controlling operation of the slow cooker in a probe mode wherein the temperature probe is inserted into the foodstuff and transmits foodstuff temperatures to the controller for controlling the heating of the foodstuff, a program mode wherein the controller actuates the heating element to heat the container at a temperature for a selected amount of time and subsequently at a lower temperature and a manual mode wherein the controller actuates the heating element to heat the container at a selected temperature.

2. The slow cooker of claim 1 further comprising:
 a control panel for mounting the controller to the shell, the control panel including a display and a plurality of control buttons, each control button being in communication with the controller, the control buttons including at least one of a probe button, a manual button, a program button, an enter button, an on/off button and increase and decrease buttons.

3. The slow cooker of claim 1 further comprising:
 a pair of U-shaped handles mounted to opposing sides of the shell; and
 a lid removably mountable to a mouth of the container, the lid including a probe hole extending therethrough that removably receives a shaft of the temperature probe, the temperature probe being insertable through the probe hole for insertion of at least a tip of the temperature probe into the foodstuff.

4. The slow cooker of claim 3 wherein the lid includes a gripping knob on a top surface.

5. The slow cooker of claim 1 further comprising:
 a probe storage cavity located proximate a bottom surface of the shell, the probe storage cavity being shaped and sized for removably receiving the temperature probe when the temperature probe is in a storage position.

6. The slow cooker of claim 1 further comprising:
 a probe outlet exposed on a side surface of the shell, the temperature probe including a shaft, a body, a cord and a plug, the shaft extending from the body and including a tip at a distal end, the cord extending from the body and the plug mounted to a distal end of the cord, the plug being removably insertable into the probe outlet to establish communication between the controller and the temperature probe.

7. The slow cooker of claim 1 wherein the shell includes an air gap being defined by the liner, the base and the external wrap, the heating element being secured to the liner within the air gap.

8. The slow cooker of claim 7 wherein the external wrap and the liner are constructed of a metallic material and the base is constructed of a polymeric material, the liner including a fastener to secure the liner to the base.

9. The slow cooker of claim 1 wherein the temperature probe includes a body, a shaft, a cord and a plug.

10. A slow cooker for cooking a foodstuff to be consumed over a period of time, the slow cooker comprising:
    a shell including a base, an external wrap extending upwardly from the base, a liner spaced from and positioned within the external wrap, and a heating cavity;
    a heating element wrapped around a sidewall of the liner to heat the heating cavity;
    a container removably positionable within the heating cavity, the container including a mouth and a food cavity for receiving the foodstuff;
    a lid removably mountable to the mouth of the container;
    a temperature probe removably insertable directly into the foodstuff to be consumed, the temperature probe including a shaft, a body, a cord and a plug, the shaft extending from the body and including a tip at a distal end, the cord extending from the body and the plug mounted to a distal end of the cord;
    a probe outlet exposed on an exterior side surface of the shell slow cooker, the plug of the temperature probe being removably insertable into the probe outlet to establish communication between the controller and the temperature probe, wherein the cord extends from the plug on the exterior side surface of the shell through the mouth of the container to insert the tip of the temperature probe into the foodstuff; and
    a controller mounted to the shell, the controller controlling operation of the slow cooker in a probe mode wherein the temperature probe is inserted into the foodstuff and transmits foodstuff temperatures to the controller for controlling the heating of the foodstuff, a program mode wherein the controller actuates the heating element to heat the container at a temperature for a selected amount of time and subsequently at a lower temperature and a manual mode wherein the controller actuates the heating element to heat the container at a selected temperature.

11. The slow cooker of claim 1 wherein the temperature probe includes a body, a shaft, a cord and a plug, the body of the temperature probe including a cord groove for removable receipt and storage of the cord proximate the body.

12. The slow cooker of claim 1 wherein the temperature probe includes a body, a shaft, a cord and a plug, the body of the temperature probe including at least one plug storage hole therein for removable receipt and storage of the plug proximate the body.

13. A method of cooking a foodstuff to be consumed in a slow cooker over a period of time, the slow cooker including a shell having a base, an external wrap extending upwardly from the base, a liner spaced from and positioned within the external wrap, and a heating cavity, a heating element wrapped around a sidewall of the liner to heat the heating cavity, a container removably positionable within the heating cavity, a controller to control heating of the heating cavity, a display in communication with the controller; a lid and a temperature probe, the method including the steps of:
    a) inserting a foodstuff into the container;
    b) positioning the container in the heating cavity;
    c) inserting at least a portion of the temperature probe directly into the foodstuff to be consumed;
    d) selecting a desired probe set temperature and storing the probe set temperature in the controller;
    e) actuating the controller to operate the slow cooker in a probe mode;
    f) automatically heating the heating cavity at a cooking temperature using the heating element;
    g) detecting an actual foodstuff temperature with the temperature probe;
    h) transmitting the actual foodstuff temperature to the controller;
    i) comparing the actual foodstuff temperature to the desired probe set temperature using the controller;
    j) automatically directing the heating element to heat the heating cavity at a warm temperature lower than the cooking temperature when the detected foodstuff temperature is equal to or greater than the desired probe set temperature; and
    k) automatically cutting power to the heating element after a maximum time elapses.

14. The method of cooking a foodstuff in a slow cooker of claim 13 comprising the further steps of:
    l) cutting communication between the temperature probe and controller;
    m) automatically sounding a tone indicating that the temperature probe is not in communication with the controller;
    n) automatically directing the heating element to heat the heating cavity at a high temperature;
    o) automatically resuming steps (g)-(j) when communication is re-established between the temperature probe and controller.

15. The method of cooking foodstuff in a slow cooker of claim 13 including the further steps of:
    l) indicating the probe set temperature on the display for a first time period;
    m) indicating the foodstuff temperature on the display for a second time period at the conclusion of the first time period; and
    n) repeating steps (l) and (m) until step (k).

16. The method of cooking foodstuff in a slow cooker of claim 15 wherein the first and second time periods are five seconds (5 s).

17. The method of cooking foodstuff in a slow cooker of claim 13 wherein a tone is sounded at step (f), at step (j), and at step (k).

* * * * *

(12) INTER PARTES REEXAMINATION CERTIFICATE (676th)
United States Patent
Gaynor et al.

(10) Number: US 7,820,947 C1
(45) Certificate Issued: Aug. 21, 2013

(54) SLOW COOKER

(75) Inventors: Jim Gaynor, Richmond, VA (US);
Yvonne Olson, Richmond, VA (US);
Adam Steinman, Richmond, VA (US)

(73) Assignee: UBS AG, Stamford Branch, Stamford, CT (US)

Reexamination Request:
No. 95/001,956, Apr. 3, 2012

Reexamination Certificate for:
Patent No.: 7,820,947
Issued: Oct. 26, 2010
Appl. No.: 11/933,478
Filed: Nov. 1, 2007

Related U.S. Application Data

(63) Continuation of application No. 11/363,882, filed on Feb. 28, 2006, now Pat. No. 7,605,349.

(51) Int. Cl.
*F27D 11/00* (2006.01)
*A47J 27/62* (2006.01)

(52) U.S. Cl.
USPC ............. 219/442; 165/47; 219/386; 219/390; 219/391; 219/400; 219/441; 219/492; 219/494; 219/497; 219/506; 361/678; 361/690; 361/692; 99/331; 99/332; 99/333; 99/403

(58) Field of Classification Search
None
See application file for complete search history.

(56) References Cited

To view the complete listing of prior art documents cited during the proceeding for Reexamination Control Number 95/001,956, please refer to the USPTO's public Patent Application Information Retrieval (PAIR) system under the Display References tab.

*Primary Examiner* — William Kelleher

(57) ABSTRACT

A cooking appliance for cooking a foodstuff over a period of time including a shell having a heating cavity and a heating element to heat the heating cavity. A container is removably positionable within the heating cavity and includes a food cavity for receiving the foodstuff. A temperature probe is removably insertable into the foodstuff and a controller is mounted to the shell. The controller controls operation of the cooking appliance in a probe mode wherein the temperature probe is inserted into the foodstuff and transmits foodstuff temperatures to the controller for controlling the heating of the foodstuff, a program mode wherein the controller actuates the heating element to heat the container at a temperature for a selected amount of time and subsequently at a lower temperature and a manual mode wherein the controller actuates the heating element to heat the container at a selected temperature.

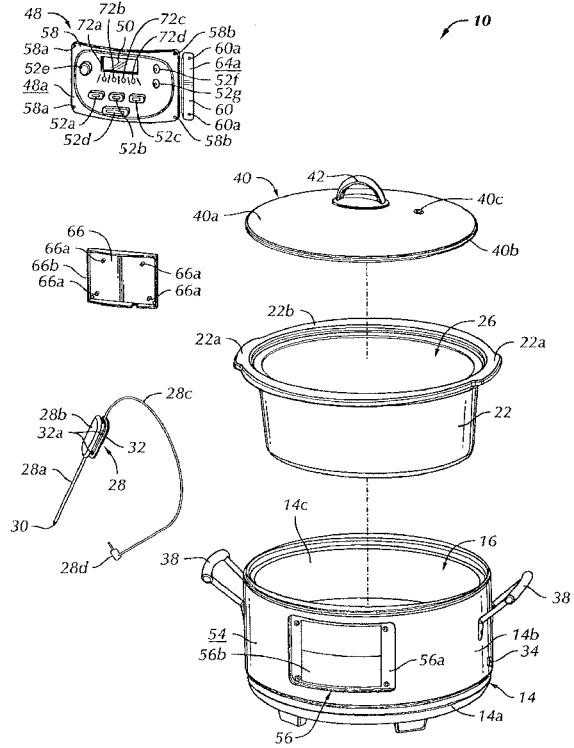

(Amended)

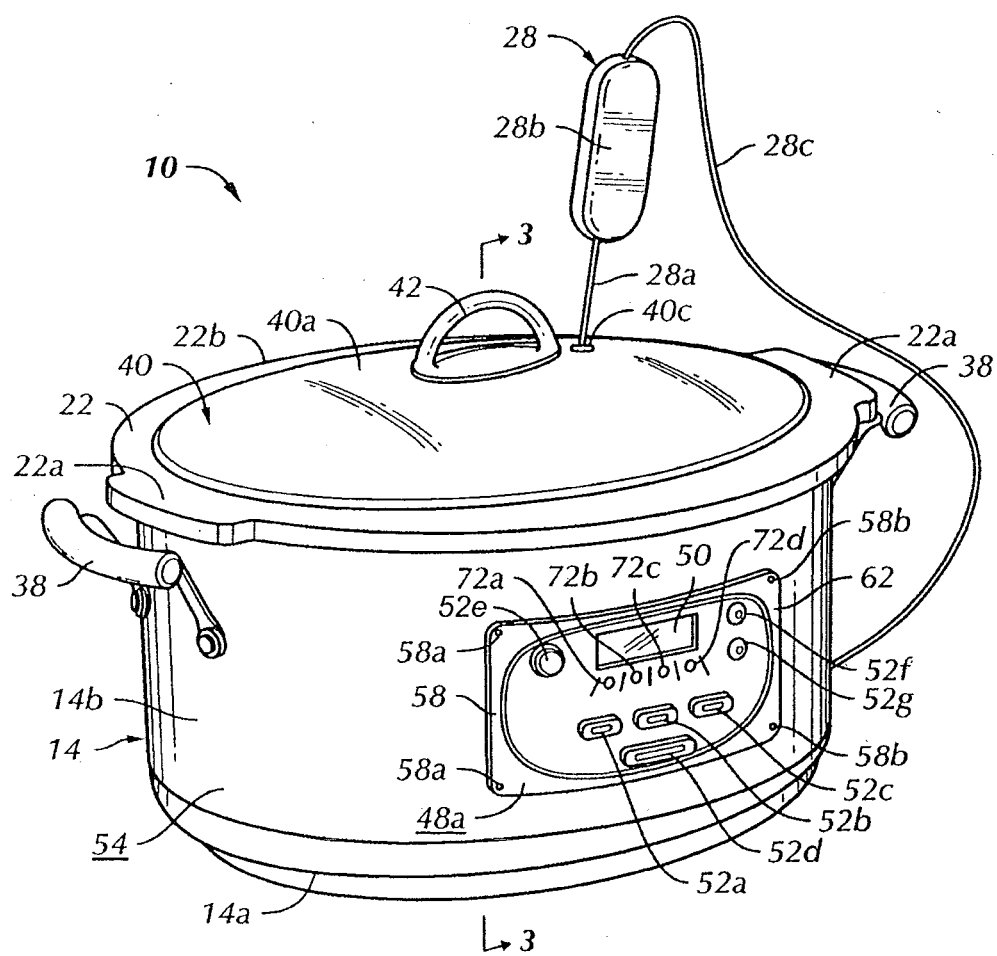
FIG. 1
(Amended)

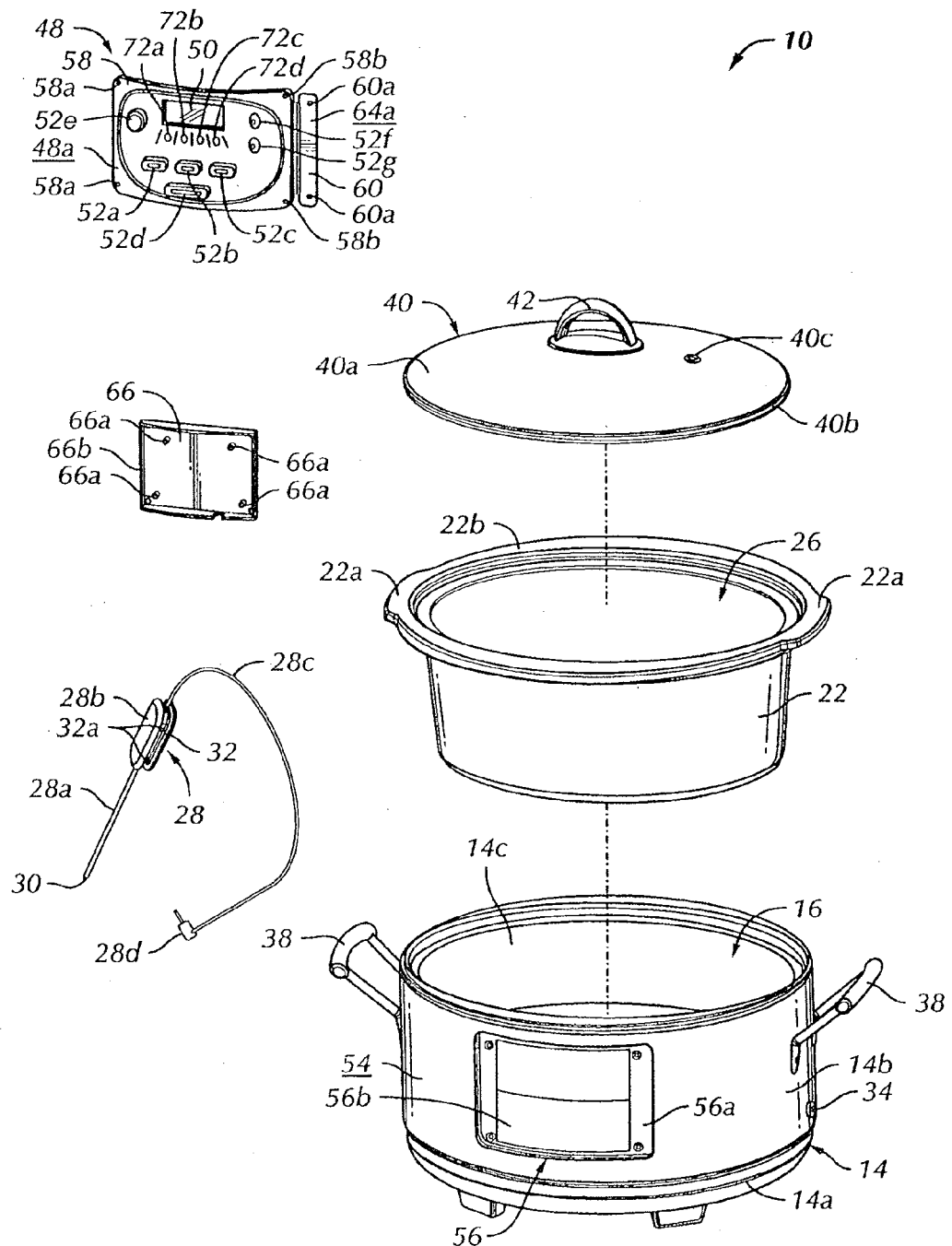
FIG. 2
(Amended)

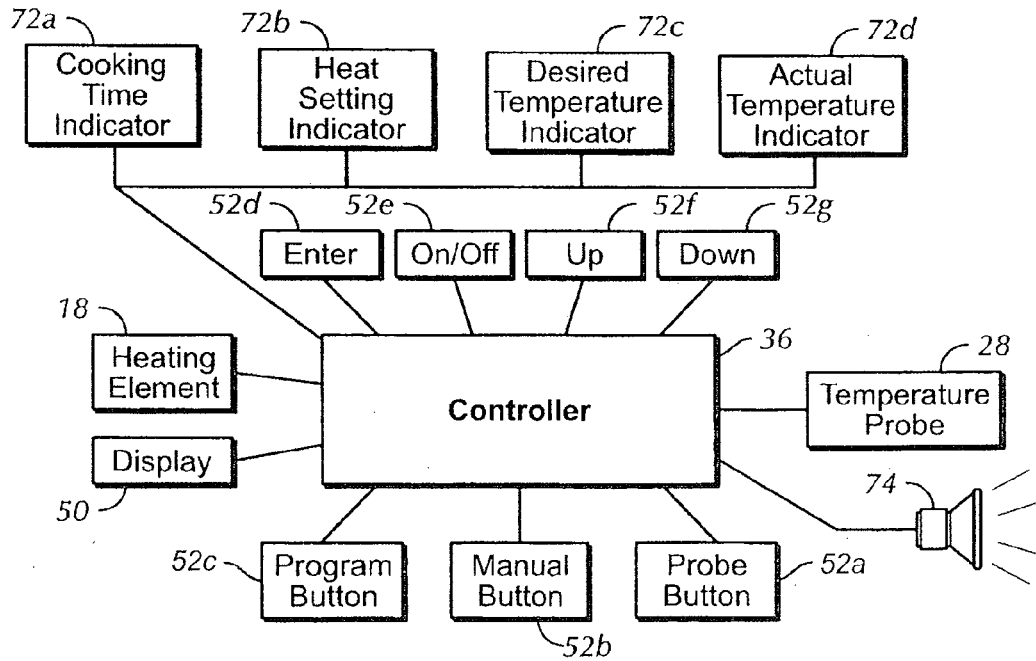
*FIG. 6*
(Amended)

US 7,820,947 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 10, lines 41-61:

In the preferred embodiment, in the probe mode, the plug 28d is engaged with the probe outlet 34 and the shaft 28a of the temperature probe 28 is inserted into the food cavity 26 through the probe hole 40c such that the probe tip 30 is positioned within the foodstuff 12. The probe tip 30 is preferably located proximate a center of the foodstuff 12. The slow cooker 10 is powered and a user depresses the on/off button [52b] *52e*. The probe button [52c] *52a* is depressed by the user after being prompted by the word, "SEL" on the display 50 and the controller 36 illuminates a light emitting diode (LED) on or proximate to the probe button [52c] *52a* to indicate to the user that the slow cooker 10 is operating in the probe mode, illuminates a cook time indicator 72a beneath the display 50 and displays the word, "HIGH" on the display 50. The user may then depress the up or down buttons 52f, 52g to toggle between the words, "HIGH" and "LOW" on the display 50, indicating that the heating element 18 will be actuated to heat the heating cavity 16 at a high or low temperature. When the desired temperature indication is present on the display 50, the user depresses the enter button 52d to accept the desired heat setting.

Column 12, lines 39-57:

To operate the slow cooker 10 in the program mode, the slow cooker 10 is powered and a user presses the on/off button 52e. The program button [52d] *52c* is depressed by a user upon prompting from the display 50 and the controller 36 automatically illuminates an LED (not shown) on or proximate the program button [52d] *52c* to indicate that the slow cooker 10 is in the program mode. The controller 36 then automatically illuminates a cooking time indicator 72a and automatically shows the phrase "4:00" on the display 50. This indicates that the default cooking time is four hours (4 hrs) for the program mode, which may be modified by depressing the up and/or down buttons 52f, 52g in thirty minute increments (30 min) in a preferred range between thirty minutes and twelve hours (12 hrs). The slow cooker 10 is not limited to the four hour default time or to the thirty minute to twelve hour cooking time range. The cooking time range and default may be nearly any time period, as will be understood by one having ordinary skill in the art. The user selects the desired cooking time shown on the display 50 by depressing the enter button 52d.

THE DRAWING FIGURES HAVE BEEN CHANGED AS FOLLOWS:

In FIGS. 1 and 2, reference character "52c" has been changed to --52e--; In FIG. 6, reference character "52a" has been changed to -52e-, and "52c" has been changed to -52a-.

AS A RESULT OF REEXAMINATION, IT HAS BEEN DETERMINED THAT:

The patentability of claims 13 and 15-17 is confirmed.

Claims 1, 10 and 14 are determined to be patentable as amended.

Claims 2-4 and 6-9, dependent on an amended claim, are determined to be patentable.

New claims 18-21 are added and determined to be patentable.

Claims 5, 11 and 12 were not reexamined.

1. A slow cooker for cooking a foodstuff over a period of time, the slow cooker comprising:
    a shell including a base, an external wrap extending upwardly from the base, a liner spaced from and positioned within the external wrap, and a heating cavity;
    a heating element positioned between the external wrap and the liner to heat the heating cavity;
    a container removably positionable within the heating cavity, the container including a food cavity for receiving the foodstuff;
    a temperature probe removably insertable into the foodstuff; and
    a controller mounted to the shell, the controller controlling operation of the slow cooker in:
    *1)* a probe mode wherein the temperature probe is inserted into the foodstuff and transmits *actual* foodstuff temperatures to the controller for controlling the heating of the foodstuff, *when the controller detects the actual temperature of the foodstuff as being equal to or greater than a desired probe set temperature selected by a user the controller automatically actuates the heating element to heat the heating cavity at a temperature solely set by the controller that is lower than the desired probe set temperature selected by the user,*
    *2)* a program mode wherein the controller actuates the heating element to heat the container at a *first user-selected* temperature for [a selected] *an* amount of time *selected by the user* and subsequently *automatically heating the container for a predetermined amount of time set solely by the controller* at a [lower] *second* temperature *set solely by the controller, the second temperature being lower than the first temperature,* and
    *3)* a manual mode wherein the controller actuates the heating element to heat the container at a selected temperature.

10. A slow cooker for cooking a foodstuff to be consumed over a period of time, the slow cooker comprising:
    a shell including a base, an external wrap extending upwardly from the base, a liner spaced from and positioned within the external wrap, and a heating cavity;
    a heating element wrapped around a sidewall of the liner to heat the heating cavity;
    a container removably positionable within the heating cavity, the container including a mouth and a food cavity for receiving the foodstuff;
    a lid removably mountable to the mouth of the container;
    a temperature probe removably insertable directly into the foodstuff to be consumed, the temperature probe including a shaft, a body, a cord and a plug, the shaft extending from the body and including a tip at a distal end, the cord extending from the body and the plug mounted to a distal end of the cord;

a probe outlet exposed on an exterior side surface of the shell *of the* slow-cooker, the plug of the temperature probe being removably insertable into the probe outlet to establish communication between the controller and the temperature probe, wherein the cord extends from the plug on the exterior side surface of the shell through the mouth of the container to insert the tip of the temperature probe into the foodstuff; and a controller mounted to the shell, the controller controlling operation of the slow cooker in:

1) a probe mode wherein the temperature probe is inserted into the foodstuff and transmits *actual* foodstuff temperatures to the controller for controlling the heating of the foodstuff, *when the controller detects the actual temperature of the foodstuff as being equal to or greater than a desired probe set temperature selected by a user the controller automatically actuates the heating element to heat the heating cavity at a temperature set solely by the controller that is lower than the desired probe set temperature selected by the user,*

2) a program mode wherein the controller actuates the heating element to heat the container at a *first user-selected* temperature for [a selected] *an* amount of time *selected by the user* and subsequently *automatically heating the container for a predetermined amount of time set solely by the controller* at a [lower] *second temperature solely set by the controller, the second temperature being lower than the first temperature,* and 3) a manual mode wherein the controller actuates the heating element to heat the container at a selected temperature.

14. The method of cooking a foodstuff in a slow cooker of claim 13 comprising the further steps of:

l) cutting communication between the temperature probe and controller;

m) automatically sounding a tone indicating that the temperature probe is not in communication with the controller;

n) automatically directing the heating element to heat the heating cavity at a high temperature; *and* o) automatically resuming steps (g)-(j) when communication is re-established between the temperature probe and controller.

*18. The slow cooker of claim 1, wherein when in the probe mode power is automatically cut to the heating element after a predetermined amount of time has elapsed.*

*19. The slow cooker of claim 18, wherein when in the program mode power is automatically cut to the heating element after a predetermined amount of time has elapsed.*

*20. The slow cooker of claim 10, wherein when in the probe mode power is automatically cut to the heating element after a predetermined amount of time has elapsed.*

*21. The slow cooker of claim 20, wherein when in the program mode power is automatically cut to the heating element after a predetermined amount of time has elapsed.*

\* \* \* \* \*